United States Patent
Sasaki

Patent Number: 5,483,679
Date of Patent: Jan. 9, 1996

[54] RADIO COMMUNICATION APPARATUS CAPABLE OF ISOLATING A RECEIVER FROM A TRANSMITTER DURING A RECEPTION OPERATION

[75] Inventor: Yutaka Sasaki, Tokyo, Japan

[73] Assignee: NEC Corporation, Tokyo, Japan

[21] Appl. No.: 147,568

[22] Filed: Nov. 5, 1993

[30] Foreign Application Priority Data

Nov. 6, 1992 [JP] Japan .................... 4-296941

[51] Int. Cl.⁶ .................................. H04B 1/40
[52] U.S. Cl. .................. 455/86; 455/76; 455/78
[58] Field of Search .......... 455/78, 76, 84–86, 455/310, 317, 318; 331/2, 46, 47; 375/219, 296; 370/32; 332/103, 104, 144, 123, 126

[56] References Cited

U.S. PATENT DOCUMENTS

| | | | |
|---|---|---|---|
| 5,276,915 | 1/1994 | Marko et al. | 455/86 |
| 5,309,429 | 5/1994 | Fukuda | 455/86 |
| 5,319,799 | 6/1994 | Morita | 455/86 |

FOREIGN PATENT DOCUMENTS 0496498  7/1992  European Pat. Off. .
0500373  8/1992  European Pat. Off. .

OTHER PUBLICATIONS

Patent Abstracts of Japan, vol. 16, No. 459 (E–1268), Sep. 24, 1992.

*Primary Examiner*—Edward F. Urban
*Assistant Examiner*—Thanh Le
*Attorney, Agent, or Firm*—Sughrue, Mion, Zinn, Macpeak & Seas

[57] ABSTRACT

In a radio communication apparatus which uses a common carrier frequency on transmission and reception operations selectively carried out in the apparatus, a frequency divider is located between a modulator operated by a predetermined modulation frequency and a modulating local oscillator which oscillates a modulating frequency equal to an integral multiple N of the predetermined modulation frequency. The frequency divider has a frequency division factor equal to N and supplies a frequency divided signal of the predetermined modulation frequency to the modulator during the transmission operation under control of a control circuit. During the reception operation, the frequency divider is put into an inactive state by the control circuit to isolate the modulating local oscillator and the modulator.

2 Claims, 2 Drawing Sheets

RADIO COMMUNICATION APPARATUS CAPABLE OF ISOLATING A RECEIVER FROM A TRANSMITTER DURING A RECEPTION OPERATION

BACKGROUND OF THE INVENTION

This invention relates to a radio communication apparatus which is capable of transmitting a transmission data signal and receiving a reception data signal and, in particular, to the radio communication apparatus which carries out communication in a manner of a time division multiple access (TDMA)-TDD (Time Domain Duplex). Such communication will be simply referred to as TDMA-TDD communication hereinunder.

In such TDMA-TDD, it is to be noted that a common carrier frequency wave is used as both a transmission carrier frequency wave and a reception carrier frequency wave and that communication is carried out in a time division fashion.

A conventional radio communication of the type described comprises a receiver and a transmitter which are used for the TDMA-TDD communication and which receive a reception data signal and transmit an input data signal, respectively. The radio communication apparatus is selectively put into a reception state or a transmission state so as to carry out the TDMA-TDD communication. In other words, the transmitter and the receiver are alternately put into an active state and an inactive state. This shows that a selected one of the transmitter and the receiver is alone put into the active state during the communication.

In the meanwhile, quadrature phase shift keying (QPSK), especially, π/4-shift QPSK, has been often used in the transmitter of the TDMA-TDD communication to modulate a data signal and to transmit a transmission radio wave subjected to the QPSK. Such a modulated signal which is subjected to the QPSK in the above-mentioned manner is received as a reception radio wave by the receiver.

In the radio communication apparatus for the TDMA-TDD communication, a common local frequency is also used as a local transmission frequency and a local reception frequency so as to carry out the transmission and the reception operations by the use of the common carrier frequency wave in the transmitter and the receiver, respectively.

With the radio communication apparatus, it is preferable that the transmitter is completely electromagnetically isolated from the receiver while the reception operation is carried out in the receiver with the transmitter kept inactive. Stated otherwise, the transmission radio wave should be sufficiently attenuated during the reception operation. Otherwise, the transmission radio wave signal adversely influences the reception radio wave because both the transmission and the reception radio waves include a common frequency component. Such an adverse influence also occurs from using the common local frequency in the transmitter and the receiver. This results in degradation of a reception characteristic in the receiver.

Herein, recent requirements have been to make the radio communication apparatus small in size and light in weight. Under the circumstances, complete isolation can not be kept between the transmitter and the receiver of the above-mentioned radio communication apparatus. Therefore, the reception characteristic is inevitably degraded in the conventional radio communication apparatus.

In order to achieve sufficient isolation between the transmitter and the receiver, consideration might be made about putting a modulation circuit of the transmitter into an inactive state by switching off a modulation local oscillator of the modulation circuit. However, such a modulation local oscillator is slowly switched on after it is once switched off. This means that such a radio communication apparatus is unsuitable for the TDMA-TDD communication because the reception and the transmission operations should be changed from one to another within a very short time interval in the TDMA-TDD communication.

SUMMARY OF THE INVENTION

It is an object of this invention to provide a radio communication apparatus which is pertinent to TDMA-TDD communication and which is capable of sufficiently isolating a transmitter and a receiver during a reception operation in the receiver.

It is another object of this invention to provide a radio communication apparatus of the type described, which is capable of attenuating a transmission modulated signal to the extent of avoiding a reduction of a reception characteristic of the receiver.

It is still another object of this invention to provide a radio communication apparatus of the type described, which can quickly be changed from a reception operation to a transmission operation.

A radio communication apparatus to which this invention is applicable comprises a transmitter and a receiver which carry out transmission operation of an input data signal and reception operation of a reception data signal produced as an output data signal, respectively, by using a local frequency signal which is common to the transmission and the reception operations and which is produced by a common local oscillator. According to this invention, the transmitter comprises modulation means for subjecting the transmission data signal to predetermined modulation by the use of a predetermined modulation frequency to produce a transmission modulated signal, modulation local oscillation means for generating a modulation local oscillation signal of a modulation local oscillation frequency equal to an integral multiple N of the predetermined modulation frequency, where N is an integer greater than unity, controllable frequency dividing means, which is located between the modulation means and the modulation local-oscillation means and which has a frequency division factor equal to the integral multiple N, for frequency dividing the modulation local oscillation frequency of the modulation local oscillation signal into the predetermined modulation frequency by the frequency division factor N to supply the predetermined modulation frequency to the modulation means, control means for producing a control signal to control operation of the controllable frequency dividing means, and transmitter mixing means for mixing the transmission modulated signal with the local frequency signal.

DESCRIPTION OF THE PREFERRED EMBODIMENT

Figure 1:
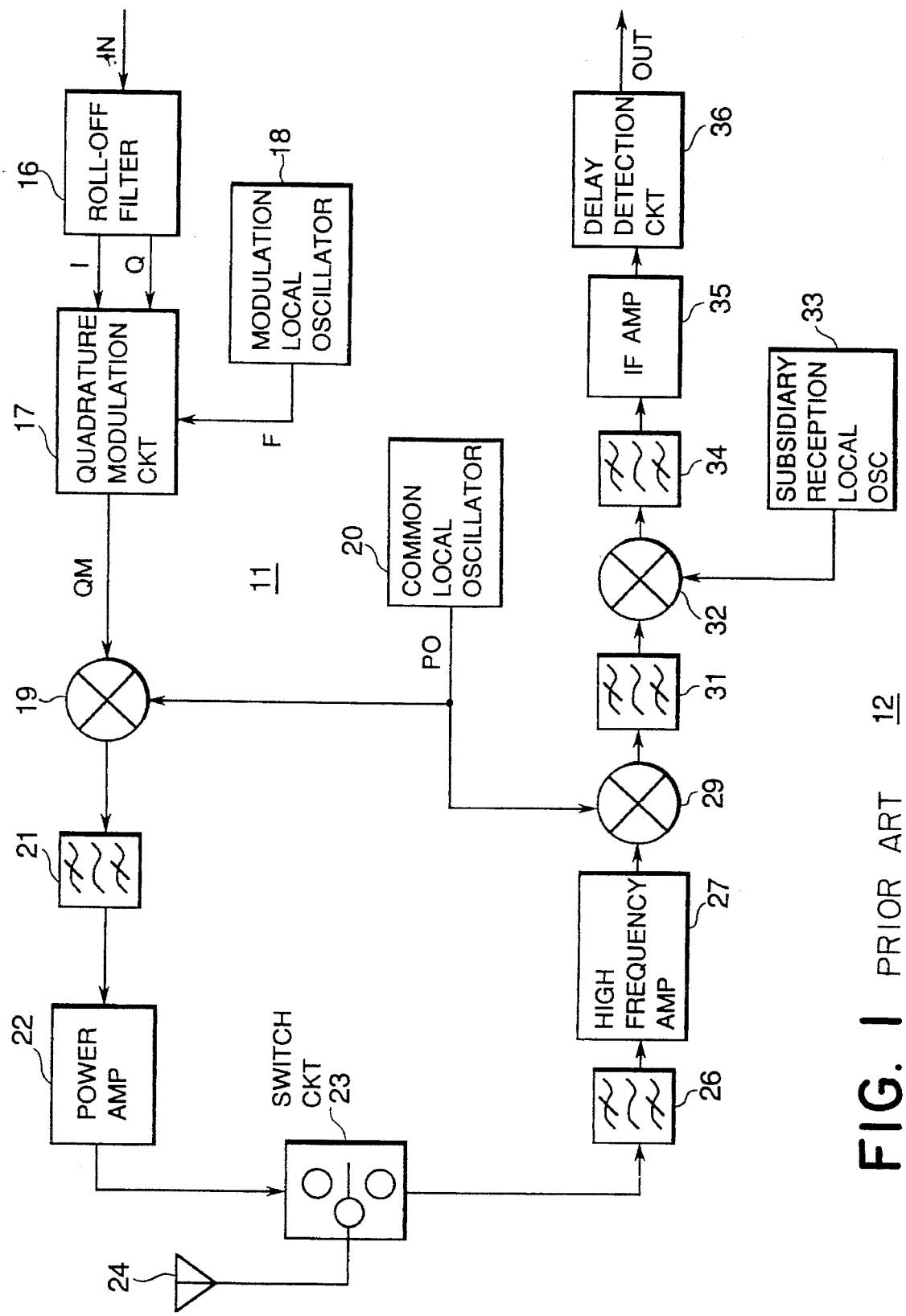
FIG. 1 is a block diagram of a conventional radio communication apparatus used for TDMA-TDD communication.

Referring to FIG. 1, a conventional radio communication apparatus is used as a radio telephone set in TDMA-TDD communication which alternately carries out transmission and reception operations in a time division fashion by the use of a common communication carrier frequency for the transmission and the reception operations.

The illustrated radio communication apparatus comprises a transmitter or a transmitter section 11 supplied with an input data signal IN and a receiver or a receiver section 12 supplied with a reception modulated signal or a reception radio wave to produce an output data signal OUT. From this fact, it is readily understood that the transmitter 11 carries out the transmission operation of the input data signal IN while the receiver 12 carries out the reception operation for the output data signal OUT.

In the transmitter 11, the input data signal IN is delivered to a roll-off filter 16. The roll-off filter 16 separates the input data signal IN into an in-phase component signal I and a quadrature component signal Q. The in-phase and the quadrature component signals I and Q are sent to a quadrature modulation circuit 17 which is supplied from a modulation local oscillator 18 with a modulation local oscillation signal of a predetermined frequency F. The predetermined frequency F may be referred to as a modulation local frequency.

The quadrature modulation circuit 17 quadrature modulates the modulation local oscillation signal of the predetermined frequency F by the in-phase and the quadrature component signals I and Q to produce a quadrature modulated signal QM. Practically, the illustrated quadrature modulation circuit 17 executes π/4-shift quadrature phase shift keying (QPSK) as the quadrature modulation and produces a QPSK modulated signal as the quadrature modulated signal QM. Thus, the quadrature modulated signal QM is obtained by modulating a frequency equal to the predetermined frequency F sent from the modulation local oscillator 18 and may be called a transmission modulated signal.

The quadrature modulated signal QM is supplied to a transmission mixer 19 connected to a common local oscillator 20 which is also used in the receiver 12 in common, as will be mentioned later in detail. The common local oscillator 20 generates a primary local oscillation signal PO of a primary frequency determined for the radio communication apparatus. The transmission mixer 19 mixes the quadrature modulated signal QM with the primary local oscillation signal PO to produce a transmission signal. The transmission signal is allowed to pass through a filter 21 to remove a spurious component included in the transmission signal and is thereafter amplified by a power amplifier 22 into an amplified transmission signal. The amplified transmission signal is transmitted through a switch circuit 23 and an antenna 24 in the form of a transmission radio wave which has a transmission carrier frequency.

On the other hand, let the illustrated radio communication apparatus be operated to receive a reception radio wave which is carried by a reception carrier frequency identical with the transmission carrier frequency. In this event, the reception radio wave conveys the output data signal OUT which is to be reproduced by the receiver 12. The switch circuit 23 is switched from the transmitter 11 to the receiver 12.

More specifically, the radio reception signal is received by the antenna 24 and is sent through the switch circuit 23 to a reception filter 26 to allow a desired high frequency component alone to pass therethrough. The desired high frequency component is amplified by a high frequency amplifier 27 to a prescribed level and is delivered as an amplified reception signal to a first reception mixer 29 which is supplied from the common local oscillator 20 with the primary local oscillation signal PO.

From this fact, it is readily understood that the primary local oscillation signal PO is supplied not only to the transmission mixer 19 but also to the first reception mixer 29 and is used in the transmitter 11 and the receiver 12 in common.

At any rate, the first reception mixer 29 mixes the amplified reception signal with the primary local oscillation signal PO to produce a first mixed reception signal. The first mixed reception signal is sent to a first intermediate frequency (IF) reception filter 31 to allow only a first IF reception frequency signal to pass therethrough. The first IF reception frequency signal is sent to a second reception mixer 32 which is supplied with a secondary reception local frequency signal of a secondary reception local frequency from a subsidiary reception local oscillator 33.

The second reception mixer 32 mixes the first reception IF frequency signal with the secondary reception local frequency signal to supply a second mixed reception signal to a second IF reception filter 34. A second IF reception frequency signal of a second IF reception frequency is derived by the second IF reception filter 34 from the second mixed reception signal and is amplified by an IF amplifier 35 to a preselected level to be produced as an IF amplified reception signal. The IF amplified reception signal is delivered to a delay detection circuit 36 to be subjected to delay detection. As a result, the output data signal OUT is produced from the delay detection circuit 36.

As mentioned above, the communication carrier frequency is used in common to the transmitter 11 and the receiver 12. This shows that the transmission modulated signal, namely, the quadrature modulated signal QM from the quadrature modulation circuit 17 should be sufficiently attenuated when the receiver 12 is put into an active state or carries out the reception operation.

To this end, a switch might be located between the modulation local oscillator 18 and the quadrature modulation circuit 17 to switch on or off the modulation local frequency signal sent from the modulation local oscillator 18.

In the intercom, it is to be noted that the modulation local oscillator 18 is usually formed by a frequency synthesizer of a PLL type which inevitably causes a frequency drift to occur in the modulation local frequency signal when such a frequency synthesizer is switched on or off by the switch.

In any event, switching on or off the modulation local frequency signal is not suitable for the radio communication apparatus used for the TDMA-TDD communication because the transmission and the reception operations should be switched from one to another within a very short time.

Figure 2:
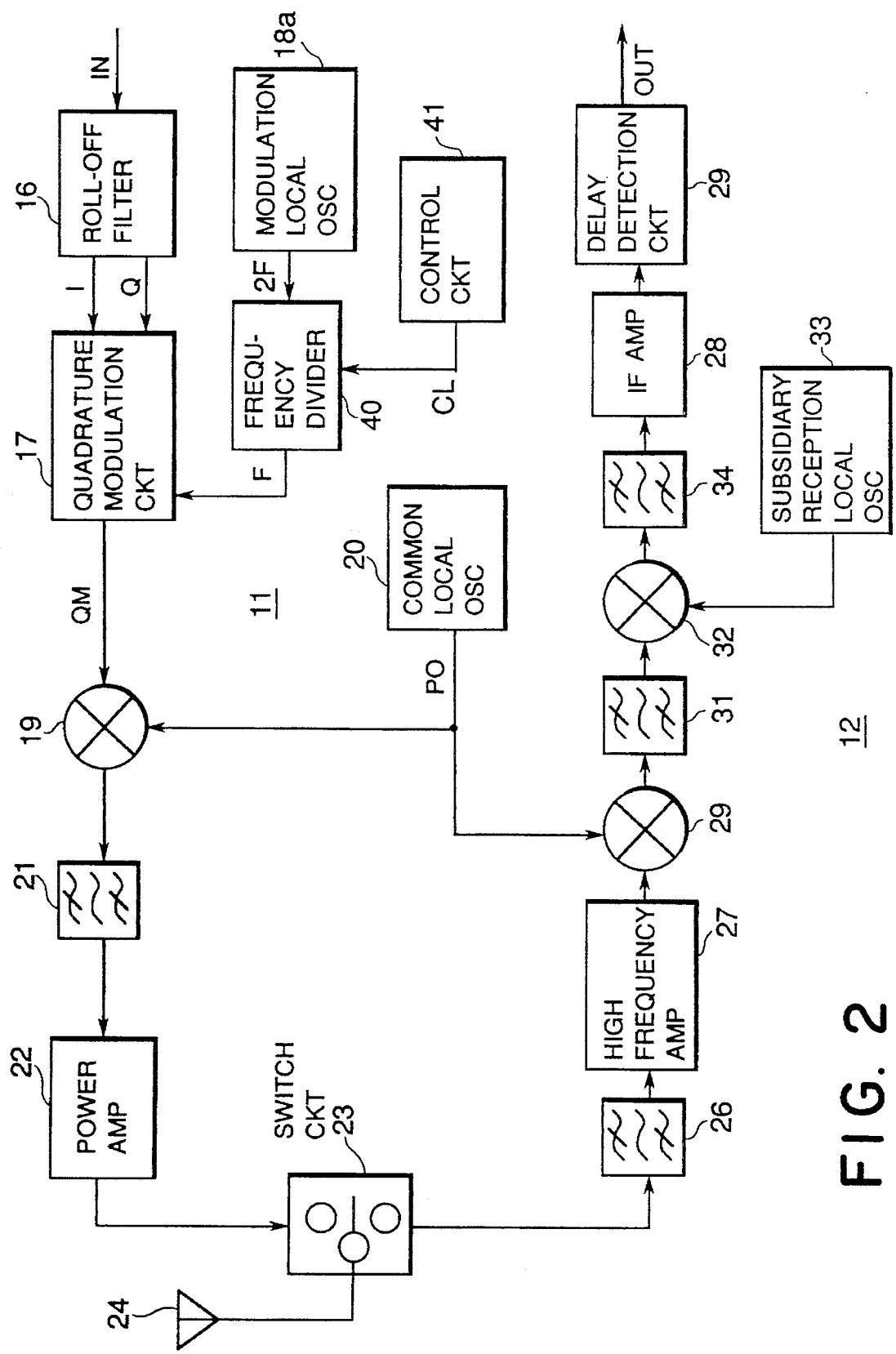
FIG. 2 is a block diagram of a radio communication apparatus according to a preferred embodiment of this invention.

Referring to FIG. 2, a radio communication apparatus according to a preferred embodiment of this invention is similar in structure to that illustrated in Fig, 1 except that the transmitter 11 shown in FIG. 2 comprises a modulation local oscillator 18a somewhat different from that illustrated in FIG. 1, as will become clear, a controllable frequency divider 40 located between the modulation local oscillator 18a and the quadrature modulation circuit 17, and a control circuit 41 connected to the frequency divider 40 to control the same in a manner to be described later.

Specifically, the modulation local oscillator 18a oscillates a modulation local frequency signal of a frequency which is equal to an integral multiple N of the predetermined frequency F, as mentioned in conjunction with FIG. 1, where N is an integer greater than unity. In the example being illustrated, N may be considered as being equal to two, without generality of description. With this structure, the modulation local frequency signal has the frequency equal to twice the predetermined frequency F and is delivered to the frequency divider 40 which may have a frequency division factor of two.

As a result, the frequency divider 40 supplies the quadrature modulation circuit 17 with a frequency divided signal of the predetermined frequency F when it is put into an active state by the control circuit 41. The frequency divided signal may be referred to as a desired or a predetermined modulation local signal of the predetermined frequency F.

Now, description will be made about a transmission operation of the radio communication apparatus and a reception operation thereof hereinunder.

At first, the transmission operation will be described on condition that the switch circuit 23 is connected to the transmitter 11 on the transmission operation, like in FIG. 1. In this situation, the control circuit 41 may be implemented by a manual switch which is manually switched on or off and which may be switched simultaneously with the switch circuit 23. At any rate, the control circuit 41 sends a control signal CL to the frequency divider 40 on the transmission operation so as to put the frequency divider 40 into an active state. In the active state, the frequency divider 40 divides the frequency of the modulation local frequency signal into a half of the frequency that is identical with the predetermined frequency F used in the quadrature modulation circuit 17 and which is delivered to the quadrature modulation circuit 17 as the frequency divided signal as the predetermined modulation local signal of the predetermined frequency F. As a result, the quadrature modulation circuit 17 quadrature modulates the predetermined modulation local signal by the in-phase component signal I and the quadrature component signal Q like in FIG. 1 to produce the quadrature modulated signal QM as the transmission modulated signal. The quadrature modulated signal QM is mixed, filtered, and amplified in the manner mentioned with reference to FIG. 1 to be sent as the transmission radio wave. Therefore, description will be omitted from the instant specification.

On the other hand, the control circuit 41 interrupts production of the control signal CL on the reception operation to put the frequency divider 40 into an active state. In this case, the switch circuit 23 is connected to the receiver 12 while the modulation local oscillator 18a oscillates, without cease, the modulation local oscillation signal of the frequency equal to twice the predetermined frequency F. Inasmuch as the frequency divider 40 has an isolation characteristic in the inactive state, the quadrature modulation circuit 17 is supplied with a remnant or a spurious component which is determined by the isolation characteristic and which is attenuated in accordance with the isolation characteristic. Moreover, the remnant component has a frequency equal to twice the predetermined frequency F.

From this fact, it is understood that the remnant component has a frequency different from the frequency of the first IF reception signal produced by the first reception mixer 32 and that the frequency of the first IF reception signal is not included in the remnant component. Accordingly, it is possible to avoid a degradation of a reception characteristic in the receiver during the reception operation. In addition, the remnant component of the transmitter 11 can be sufficiently attenuated by the transmission filter 21 also because the remnant component has the frequency equal to twice the predetermined frequency F.

While this invention has thus far been described in conjunction with a preferred embodiment thereof, it will readily be possible for those skilled in the art to put this invention into practice in various other manners. For example, the frequency division factor of the frequency divider 40 may be changed from one to another under control of the control circuit 41 for the transmission and the reception operations. Specifically, the frequency division factor on the transmission operation may be set into m, where m is an integer greater than unity while the frequency division factor on the reception operation may be changed to k, where k is an integer greater than unity and smaller than m. In addition, a frequency synthesizer of a PLL type may be used as the modulation local oscillator 18a. Furthermore, this invention is applicable to a communication system which uses a common carrier frequency on reception and transmission. Therefore, this invention may not be restricted to the TDMA-TDD communication. The quadrature modulation circuit may be changed to another modulation circuit.

What is claimed is:

1. A radio communication apparatus comprising a transmitter for performing a transmission operation on an input data signal and a receiver for performing a reception operation on a reception data signal to produce an output data signal, the apparatus utilizing a local frequency signal that is common to the transmission and the reception operations and that is produced by a common local oscillator, the transmitter comprising:

modulation means for subjecting the input data signal to predetermined modulation at a predetermined modulation frequency to produce a transmission modulated signal;

modulation local oscillation means for generating a modulation local oscillation signal of a modulation local oscillation frequency equal to an integral multiple N of the predetermined modulation frequency, where N is an integer greater than one;

a control circuit for producing a control signal;

a single controllable frequency divider circuit, located between the modulation means and the modulation local oscillation means and connected to the control circuit, the controllable frequency divider circuit being put into an active state in response to the control signal, and being put into an inactive state by absence of the control signal, the controllable frequency divider circuit having a frequency division factor changeable from m to k, where m is an integer greater than one and k is an integer different from m, the controllable frequency divider circuit operating, wherein (1) during the active state, the controllable frequency divider circuit frequency divides the modulation local oscillation signal by the frequency division factor m to supply the predetermined modulation frequency to the modulation means, and (2) during the inactive state, the controllable frequency divider circuit frequency divides the modulation local oscillation signal by the frequency division factor k into a frequency different from the predetermined modulation frequency; and a transmitter mixer for mixing the transmission modulated signal with the local frequency signal to produce a mixed transmission signal with a spurious component removed from the mixed transmission signal.

2. A radio communication apparatus for TDMA-TDD communication by quadrature phase shift keying, said radio communication apparatus comprising a transmitter for performing a transmission operation on an input data signal and a receiver for performing a reception operation on a reception data signal to produce an output data signal, the apparatus utilizing a local frequency signal that is common to the transmission and the reception operations and that is produced by a common local oscillator, the transmitter comprising:

quadrature modulation means for subjecting the input data signal to the quadrature phase shift keying at a predetermined modulation frequency to produce a transmission modulated signal;

modulation local oscillation means for generating a modulation local oscillation signal of a modulation local oscillation frequency equal to an integral multiple N of the predetermined modulation frequency, where N is an integer greater than one;

a control circuit for producing a control signal;

a single controllable frequency divider circuit, located between the modulation means and the modulation local oscillation means and connected to the control circuit, the controllable frequency divider circuit being put into an active state in response to the control signal, and being put into an inactive state by absence of the control signal, the controllable frequency divider circuit having a frequency division factor changeable from m to k, where m is an integer greater than one and k is an integer different from m, the controllable frequency divider circuit operating, wherein (1) during the active state, the controllable frequency divider circuit frequency divides the modulation local oscillation signal by the frequency division factor m to supply the predetermined modulation frequency to the modulation means, and (2) during the inactive state, the controllable frequency divider circuit frequency divides the modulation local oscillation signal by the frequency division factor k into a frequency different from the predetermined modulation frequency; and a transmitter mixer for mixing the transmission modulated signal with the local frequency signal to produce a mixed transmission signal with a spurious component removed from the mixed transmission signal.

* * * * *

UNITED STATES PATENT AND TRADEMARK OFFICE
CERTIFICATE OF CORRECTION

PATENT NO. : 5,483,679
DATED : January 9, 1996
INVENTOR(S) : Yutaka SASAKI

It is certified that error appears in the above-indentified patent and that said Letters Patent is hereby corrected as shown below:

Column 4, line 42, delete "intercom" and insert therefor --interim--.

Signed and Sealed this

Twenty-fifth Day of June, 1996

Attest:

BRUCE LEHMAN

Attesting Officer        *Commissioner of Patents and Trademarks*